(12) United States Patent
Apel et al.

(10) Patent No.: US 7,715,126 B2
(45) Date of Patent: May 11, 2010

(54) COMPOUND LENS HAVING A SEALING CONFIGURATION SUITABLE FOR MOTOR VEHICLES

(75) Inventors: Uwe Apel, Neckartailfingen (DE); Christian Hoellt, Nidderau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/631,431

(22) PCT Filed: May 24, 2005

(86) PCT No.: PCT/EP2005/052363

§ 371 (c)(1),
(2), (4) Date: Jul. 30, 2007

(87) PCT Pub. No.: WO2006/003060

PCT Pub. Date: Jan. 12, 2006

(65) Prior Publication Data

US 2007/0280091 A1    Dec. 6, 2007

(30) Foreign Application Priority Data

Jul. 2, 2004    (DE) .................. 10 2004 032 179

(51) Int. Cl.
  *G02B 7/02* (2006.01)
(52) U.S. Cl. ..................................... 359/819
(58) Field of Classification Search ............... 359/753, 359/819, 820–823, 694–703
See application file for complete search history.

(56) References Cited

U.S. PATENT DOCUMENTS

| 2,394,894 | A |   | 2/1946 | Burgert et al. |
|---|---|---|---|---|
| 4,088,397 | A | * | 5/1978 | Jourdan et al. ............... 359/820 |
| 4,662,717 | A | * | 5/1987 | Yamada et al. .............. 359/362 |
| 4,887,887 | A |   | 12/1989 | Hart et al. |
| 4,909,599 | A |   | 3/1990 | Hanke et al. |
| 5,519,543 | A |   | 5/1996 | Olsson et al. |
| 5,926,326 | A |   | 7/1999 | Fischer et al. |
| 6,496,232 | B1 | * | 12/2002 | Shinobu ..................... 348/825 |
| 6,757,112 | B1 |   | 6/2004 | Whitty |
| 2002/0005997 | A1 | * | 1/2002 | Oba ........................... 359/819 |
| 2002/0027864 | A1 | * | 3/2002 | Kishima et al. ......... 369/112.24 |
| 2002/0186476 | A1 |   | 12/2002 | Sasano et al. |
| 2004/0190286 | A1 | * | 9/2004 | Chapman .................... 362/171 |
| 2004/0233538 | A1 | * | 11/2004 | Suga .......................... 359/614 |
| 2005/0024747 | A2 | * | 2/2005 | Chen .......................... 359/753 |

FOREIGN PATENT DOCUMENTS

| DE | 11 13 101 | 8/1961 |
|---|---|---|
| GB | 568 590 | 4/1945 |
| JP | 2002 90603 | 3/2002 |
| WO | WO 2005/031423 | 4/2005 |

\* cited by examiner

*Primary Examiner*—Ricky L Mack
*Assistant Examiner*—Vipin M Patel
(74) *Attorney, Agent, or Firm*—Kenyon & Kenyon LLP

(57) ABSTRACT

An optical recording unit having a compound lens which includes a lens stack. The lens stack encompasses a plurality of lenses, which are inset in a tubular housing. The lens stack includes a spacer ring which accommodates a sealing material or a sealing element and which is braced resiliently against one of the lenses in the tubular housing.

27 Claims, 2 Drawing Sheets

COMPOUND LENS HAVING A SEALING CONFIGURATION SUITABLE FOR MOTOR VEHICLES

BACKGROUND INFORMATION

Camera modules used in motor vehicle operation are not only subject to high mechanical stresses, but to considerable temperature fluctuations as well, and to the effects of moisture. When a camera module is used that does not have a completely impervious design, under the climatic conditions typical of automotive applications, this can lead, on the one hand, to dew formation in the optical path and, on the other hand, to degradation of the image quality. Moisture condensation is often observed when a high relative air humidity has set in inside of the camera module for a length of time at elevated temperatures, and the camera module is then cooled within a short period of time.

Optical recording units constructed from a compound lens and a sensor chip are typically designed to be hermetically sealed. The ingress of moisture resulting from vapor permeability that may be excessive for many of the materials used, can be controlled by using absorbing agents, such as zeolite, for example. Besides gluing the front lens element of a lens stack in place, it is conceivable to use sealing rings, thus, for example, O-ring seals of various materials. This is a practical approach for achieving an impervious design. Compared to fixing in place by gluing, sealing rings made of elastomer material, for example, advantageously make a reconditioning possible. Moreover, when sealing rings are used, there is no risk of contamination. To reliably ensure the sealing action when a sealing ring is used, a defined compression of the sealing ring is produced by the engagement of the threaded connection. Because manufacturing variances are inherent in the structural heights within a lens stack which may include a plurality of lenses, a constant compression is not ensured for all pieces when a sealing ring is clamped between the frontmost lens surface and a contact mass, such as a ring-shaped area in the tubular housing of the compound lens. Moreover, it must be ensured that the sealing ring is not unevenly clamped, which can result, for example, from localized overstraining when the parts are screwed in place during assembly. To ensure the requisite image quality for compound lenses in the application cases mentioned at the outset, it is important to have as few deviations as possible in the positioning of the individual lenses. Thus, the individual lenses of a lens stack require appropriate guidance; the guidance of the individual lenses must not be adversely affected by skewed sealing rings. When a seal rests on a front surface, any encroachment on the available beam diameter is disadvantageous, since the edge thickness of the front lens cannot be arbitrarily reduced.

A waterproof camera is described in Japanese Patent Application No. JP 2002 090603. The waterproof camera is equipped with a camera housing which has a front part and a rear part. A lens stack is accommodated inside of the camera housing. Within the lens stack, a hollow space is formed behind the front lens. A lens suited for taking wide-angle shots is placed inside of this hollow space. The front lens of the lens stack is provided at the opening of the lens stack and, in addition, is used as a seal. A projection at the edge of the lens stack is caulked onto the lens side in a thermal joining process. An O-ring seal is provided between the outer periphery of the lens and the peripheral surface of an inner wall for the lens stack to seal off the annular gap therebetween. In addition, another O-ring seal is provided between the outer peripheral surface of the edge part of the lens stack and the inner peripheral surface of the edge part of the front camera housing, in order to seal the clearance space therebetween.

From U.S. Pat. No. 5,519,543, an optical system for an inspection device is known. A camera that can be lowered into a bore hole in the earth or into a pipe laid in the earth, includes a tubular body made of thermally insulating material. A front lens group and a rear lens group are disposed at mutually opposing ends of the tubular member. The mutually opposing lens groups at the front and rear ends are thermally isolated from one another, a vacuum chamber, which essentially extends along the optical pathway of the light, being formed in the tubular body.

SUMMARY OF THE INVENTION

The compound lens design according to the present invention for an optical recording device makes it possible for individual parts to be assembled cost-effectively, including a front lens that is to be inserted imperviously, even while allowing for the typical manufacturing tolerances inherent in the mechanical dimensions of the individual parts. The present invention provides for a spacer ring to be integrated in the lens stack in such a way that it is set in, between the front lens and the second lens positioned downstream thereof. Along with the spacer rings, a sealing ring is inserted, making it possible to achieve both a defined compression for sealing off two surfaces, as well as a precise setting of the nominal clearance between the lenses within the lens stack.

Following the design approach of the present invention, a defined compression is able to be applied by positioning a spacer ring, along with the sealing ring integrated in the same, underneath the front lens of a lens stack when twisting the front lens into place using a securing ring. The design approach of the present invention limits the influence of manufacturing variances on the compression and, to be precise, limits the influence of those tolerances inherent in the manufacturing of the spacer ring and of the tubular housing. However, the design approach of the present invention makes it possible to compensate for the thickness tolerances of each of the lenses and of the spacer ring, as well as for variations in the length of the tubular housing.

In the approach provided by the present invention for integrating a spacer ring which also forms a retainer for the sealing ring, the available beam diameter is not encroached on, since the edge thickness of the front lens cannot be arbitrarily reduced.

In the compound lens design according to the present invention, the sealing ring integrated in the spacer ring is not located directly underneath the securing ring to be twisted on, so that it is not subjected to any twisting strain or localized overstraining. The guidance or centering of the front lens is still ensured, as before, by the inner wall of the tubular housing. Moreover, a visual inspection may be made through the front lens to check the sealing ring and the spacer ring for correct positioning; handling during assembly is also substantially facilitated.

Instead of integrating an elastomer ring to be inserted into the spacer ring, a sealing material may alternatively be injection molded directly onto the metal ring.

DETAILED DESCRIPTION

Figure 1:
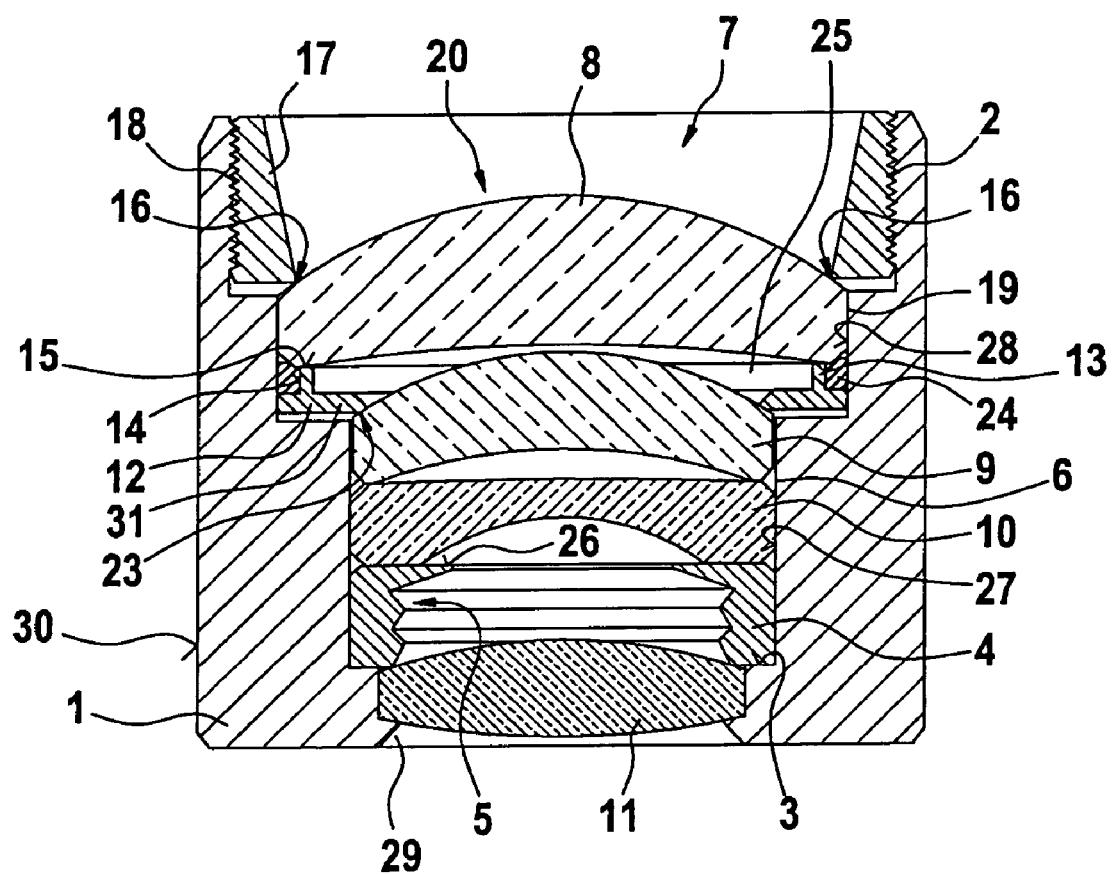
FIG. 1 shows the cross section through a lens stack of a compound lens according to the present invention.

FIG. 1 shows a compound lens in whose tubular housing 1 a lens stack 7 is inset. Tubular housing 1 includes a threaded section 2, in which a securing ring 17 is screwed into position. Securing ring 17 includes an external thread 18 which is complementary to threaded section 2 and which fixes a first lens 8 (front lens) of lens stack 7 in position in tubular housing 1. Lens stack 7, which is accommodated in tubular housing 1, encompasses first lens 8 (front lens) already mentioned, a subjacent second lens 9, another third lens 10, as well as a fourth lens 11.

Hermetically closing an aperture 29 is fourth lens 11, which is inset at the bottom of tubular housing 1. Located above fourth lens 11 is a diaphragm ring 4, which may have a shaping 5 adapted to the particular optical application. On its upper side, diaphragm ring 4 has a plane face 26, on which a third lens 10 rests flat. A second, convexly and concavely curved lens 9 rests on third lens 10. Second lens 9 and third lens 10 are guided inside of a first receptacle 6 of tubular housing 1, in such a way that they are centered by a first centering surface 27.

In addition, tubular housing 1 has a second receptacle 19. First lens 8 (front lens) is inset in second receptacle 19, which is delimited by second centering surfaces 28. Front lens 8 has a convex curvature 20. In the peripheral regions of its convexly curved exterior side, first lens 8 is fixed in place by a hold-down edge 16 of securing ring 17. In response to securing ring 17 being screwed down, first lens 8 (front lens) is preloaded by resilient tongues against a spacer ring 12 inset in a hollow space 25 between first lens 8 and the top side of second lens 9. Spacer ring 12, which is preferably fabricated from a metallic material, includes a toroidally extending upper part 13. Upper ring part 13 has a first contact face 14 in which a sealing ring 24 is inset. Sealing ring 24 rests, on the one hand, against first contact face 14 of upper ring part 13; on the other hand, against second centering surface 28 of second receptacle 19 on the top side of spacer ring 12. Spacer ring 12, for its part, is braced by its bearing edge 23 against the convexly curved side of second lens 9.

To complete this description, it should also be mentioned that the outside surface of tubular housing 1 is denoted by reference numeral 30, and the aperture of the tubular housing in which fourth lens 11 is situated, is denoted by reference numeral 29.

By employing the spacer ring between first lens 8 (front lens) and second lens 9 and inserting a sealing ring 12, it is possible to achieve both a defined compression for sealing off two surfaces, as well as a precise setting of the nominal clearance between lenses 8, 9 of lens stack 7. The clearance between first lens 8 and second lens 9 is precisely defined by spacer ring 12. Lens stack 7 illustrated in FIG. 1 is assembled from four lenses and a diaphragm ring, beginning with fourth lens 11 which is the first to be inserted in tubular housing 1, the thickness tolerances of diaphragm ring 4, of third lens 10, of second lens 9, and of first lens 8 are cumulated. If sealing ring 24 accommodated on spacer ring 12 were located between securing ring 17, first lens 8 (front lens) and tubular housing 1, the result would be a pronounced variation in the attainable compression of sealing ring 24, due to the manufacturing variance inherent in the lens thicknesses in lens stack 7. Because only small sealing ring cross sections are feasible, an impervious fitting of lenses 8, 9, 10 and 11 fabricated from glass is not ensured, given the manufacturing variance to be expected.

In the design according to the present invention, as illustrated in FIG. 1, the sealing ring is not located directly underneath securing ring 17 to be twisted on, so that the danger of a twisting strain or of localized overstraining is eliminated. The guidance or centering of first lens 8 (front lens) in second receptacle 19 is still ensured by second centering surface 28. This permits a larger available beam diameter to pass through first lens 8 (front lens), thereby making it possible to reduce disadvantageous vignetting. The intensity in the image plane is typically not homogeneous, but rather decreases towards the peripheral region proportionally to $\cos^4 \phi$. In this context, $\phi$ denotes the field angle measured relative to the optical axis. If the path of rays in the compound lens is limited by another diaphragm in addition to aperture diaphragm (diaphragm ring 4), then the incident radiation intensity may fall off more appreciably toward the image edge than is given by the relation $\cos^4 \phi$. This additional shading toward the edge is termed vignetting, as mentioned above. By using securing ring 17 to fix first lens 8 (front lens) in position in tubular housing 1, it is possible, through this first lens 8, to visually control the correct position of both spacer ring 12, as well as of sealing ring 24 in the tubular housing 1.

In place of sealing ring 24 accommodated on spacer ring 12 in FIG. 1, a sealing material could also be extruded directly onto spacer ring 12 and, depending on the sealing operation, be used in place of sealing ring 24 shown in FIG. 1.

Spacer ring 12 illustrated in the representation according to FIG. 1 rests, on the one hand, with its bearing edge 23 on the convexly curved top side of second lens 9 and, on the other hand, is braced against second centering surface 28 of second receptacle 19. First lens 8 (front lens) rests, on the one hand, with its concavely curved top side on the top side of upper ring part 13 and, on the other hand, compresses the elastic material of sealing ring 24. Since this elastic material is held by a cage-type retainer formed by the top side of spacer ring 12, first contact face 14, as well as second centering surface 28 of second receptacle 19, the elastic material, whether it be a sealing ring 24 or extruded sealing material, is directly contacted in response to the concave rear side of first lens 8 (front lens) making contact, so that it forms a very effective seal, even when securing ring 17 is screwed on lightly. In this context, it is ensured that first lens 8 (front lens), as well as second lens 9, third lens 10, and also fourth lens 11 are centered by centering surfaces 27 and 28, respectively, of first receptacle 6 and of second receptacle 19. The design approach according to the present invention makes it possible to simultaneously seal off two surfaces, which are oriented at right angles to one another, in tubular housing 1. The design approach according to the present invention makes it advantageously possible to ensure that no ambient air is able to penetrate through the gap between first lens 8 (front lens) and tubular housing 1 and, from there, into hollow space 25.

Figure 2:
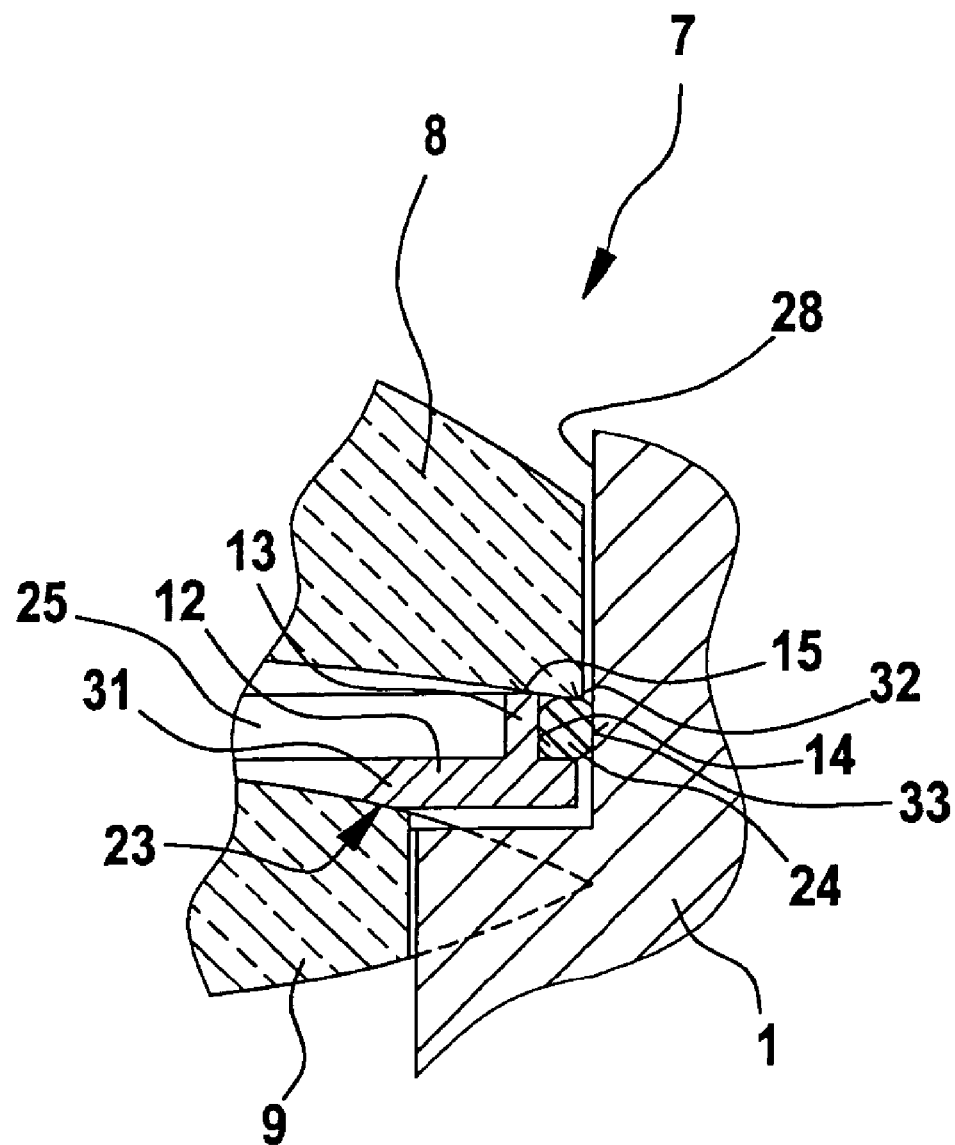
FIG. 2 illustrates a representation of the sealing region on an enlarged scale.

The sealing region is shown on an enlarged scale in the representation according to FIG. 2.

It is inferable from the representation in the figure that spacer ring 12 rests with its bearing edge 23 on second lens 9. For its part, second lens 9 is accommodated in tubular housing 1. Upper ring part 13 of spacer ring 12 fixes sealing ring 24, which, on the one hand, abuts on first contact face 14 of upper ring part 13 and, on the other hand, rests on the top side of spacer ring 12. Both a first sealing surface 32, as well as a second sealing surface 33, which extend at right angles to one another, may be sealed off by sealing ring 24. As a result of the deformation of sealing ring 24, which is accommodated inside of the cage-type retainer of spacer ring 12, both the gap between first lens 8 (front lens) and second centering surface 28 in tubular housing 1, as well as the gap between the inside of first lens 8 (front lens) may be sealed off. It is thus ensured that no ambient air and no moisture are able to penetrate into hollow space 25 accommodating spacer ring 12 (compare representation according to FIG. 1) along the outer edge of first lens 8 (front lens) and second centering surface 28 of tubular housing 1.

What is claimed is:

1. An optical recording unit comprising:
    a compound lens including a lens stack which includes at least one lens inset in a tubular housing, the lens stack including:
    a metallic spacer ring accommodating one of a sealing material and a sealing element, the spacer ring braced against one of the at least one lens of the lens stack, and providing a sealing action against a first lens and against the tubular housing; and
    a diaphragm ring in the lens stack of the optical recording unit.

2. The optical recording unit according to claim 1, wherein the spacer ring is situated in a hollow space of the tubular housing above one of the at least one lens of the lens stack.

3. The optical recording unit according to claim 1, wherein the spacer ring has an upper ring part, which, together with a centering surface of the tubular housing, forms a cage-type retainer for one of the sealing material and the sealing element.

4. The optical recording unit according to claim 1, wherein the spacer ring has a resilient section for resting against one of the at least one lens of the lens stack.

5. The optical recording unit according to claim 4, wherein the at least one lens, of the lens stack situated underneath the spacer ring is preloaded by resilient tongues against contact faces in the tubular housing.

6. The optical recording unit according to claim 1, wherein the spacer ring is braced against a convexly curved side of one of the at least one lens of the lens stack.

7. The optical recording unit according to claim 1, wherein the spacer ring is braced against a concavely curved side of one of the at least one lens of the lens stack.

8. The optical recording unit according to claim 1, wherein an upper ring part of the spacer ring has a bearing surface, which the first lens rests against when a securing ring is screwed on and when the one of the sealing material and the sealing element is contacted.

9. The optical recording unit according to claim 1, wherein the tubular housing has a first receptacle and a second receptacle, which are each delimited by centering surfaces.

10. The optical recording unit according to claim 1, wherein the optical recording unit is a component of a camera integrated in a motor vehicle.

11. The optical recording unit according to claim 1, wherein the spacer ring is situated in a hollow space of the tubular housing above one of the at least one lens of the lens stack, and wherein the spacer ring has an upper ring part, which, together with a centering surface of the tubular housing, forms a cage-type retainer for one of the sealing material and the sealing element.

12. The optical recording unit according to claim 11, wherein the spacer ring has a resilient section for resting against one of the at least one lens of the lens stack.

13. The optical recording unit according to claim 12, wherein the spacer ring is braced against a convexly curved side of one of the at least one lens of the lens stack.

14. The optical recording unit according to claim 12, wherein the spacer ring is braced against a concavely curved side of one of the at least one lens of the lens stack.

15. The optical recording unit according to claim 12, wherein the at least one lens of the lens stack situated underneath the spacer ring is preloaded by resilient tongues against contact faces in the tubular housing.

16. The optical recording unit according to claim 11, wherein an upper ring part of the spacer ring has a bearing surface, which the first lens rests against when a securing ring is screwed on and when the one of the sealing material and the sealing element is contacted.

17. The optical recording unit according to claim 11, wherein the tubular housing has a first receptacle and a second receptacle, which are each delimited by centering surfaces.

18. The optical recording unit according to claim 11, wherein the optical recording unit is a component of a camera integrated in a motor vehicle.

19. The optical recording unit according to claim 1, wherein the diaphragm ring has a plane face on which at least one lens of the lens stack rests.

20. The optical recording unit according to claim 1, wherein:
    the diaphragm ring has a plane face on which at least one lens of the lens stack rests,
    the spacer ring is situated in a hollow space of the tubular housing above one of the at least one lens of the lens stack,
    the spacer ring has an upper ring part, which, together with a centering surface of the tubular housing, forms a cage-type retainer for one of the sealing material and the sealing element,
    the spacer ring has a resilient section for resting against one of the at least one lens of the lens stack, and
    the spacer ring is braced against one of a convexly curved side and a concavely curved side of one of the at least one lens of the lens stack.

21. The optical recording unit according to claim 20, wherein:
    an upper ring part of the spacer ring has a bearing surface, which the first lens rests against when a securing ring is screwed on and when the one of the sealing material and the sealing element is contacted,
    the at least one lens of the lens stack situated underneath the spacer ring is preloaded by resilient tongues against contact faces in the tubular housing, and
    the tubular housing has a first receptacle and a second receptacle, which are each delimited by centering surfaces.

22. The optical recording unit according to claim 21, wherein the optical recording unit is a component of a camera integrated in a motor vehicle.

23. A method for arranging a lens stack, the method comprising:
    arranging a compound lens stack in a tubular housing, the compound lens stack including at least one lens inset;
    integrating a diaphragm ring and a metallic spacer ring into the compound lens stack, the spacer ring accommodating one of a sealing material and a sealing element; and
    bracing, the spacer ring against one of the at least one lens of the lens stack using one of the sealing material and the sealing element;
    wherein a sealing action is provided against a first lens and against the tubular housing.

24. The method for arranging a lens stack according to claim 23, wherein the spacer ring is situated in a hollow space of the tubular housing between two lens of the lens stack.

25. The method for arranging a lens stack according to claim 23, wherein the spacer ring upper ring part forms a cage-type retainer for one of the sealing material and the sealing element with a centering surface of the tubular housing.

26. The method for arranging a lens stack according to claim 23, wherein the spacer ring is situated in a hollow space of the tubular housing between two lens of the lens stack, and wherein the spacer ring upper ring part forms a cage-type retainer for one of the sealing material and the sealing element with a centering surface of the tubular housing.

27. The method for arranging a lens stack according to claim 23, wherein:
- the spacer ring is situated in a hollow space of the tubular housing between two lens of the lens stack,
- the spacer ring upper ring part forms a cage-type retainer for one of the sealing material and the sealing element with a centering surface of the tubular housing,
- the spacer ring is situated in a hollow space of the tubular housing between two lens of the lens stack, and
- the spacer ring upper ring part forms a cage-type retainer for one of the sealing material and the sealing element with a centering surface of the tubular housing, and
- the diaphragm ring has a plane face on which at least one lens of the lens stack rests.

* * * * *